United States Patent [19]

Rizzi

[11] 3,751,270

[45] Aug. 7, 1973

[54] SUGAR COMPOSITIONS CONTAINING AGLYCONIC DIHYDROCHALCONES

[75] Inventor: George P. Rizzi, Springfield Township, Hamilton County, Ohio

[73] Assignee: The Procter & Gamble Company, Cincinnati, Ohio

[22] Filed: Sept. 30, 1970

[21] Appl. No.: 76,974

[52] U.S. Cl. .................................. 99/141 A, 99/28
[51] Int. Cl. ............................................. A23l 1/26
[58] Field of Search ................... 99/141 A; 260/210, 260/590

[56] References Cited

UNITED STATES PATENTS

| 3,259,506 | 7/1966 | Eisenstadt | 99/141 |
| 3,429,873 | 2/1969 | Horowitz et al. | 260/210 F |

Primary Examiner—Joseph M. Golian
Attorney—Jack D. Schaeffer and Richard C. Witte

[57] ABSTRACT

Sweetening compositions comprising a natural sugar co-dissolved with certain aglyconic dihydrochalcones.

19 Claims, No Drawings

SUGAR COMPOSITIONS CONTAINING AGLYCONIC DIHYDROCHALCONES

BACKGROUND OF THE INVENTION

This invention relates to compositions for imparting sweetness to ingestibles such as foods, beverages and the like. This invention also relates to a process for enhancing the natural sweetness of certain sugars.

In recent years considerable effort has been expended in the production of artificial sweetening agents for use both by persons having metabolic disorders such as diabetes mellitus and by those wishing to reduce their caloric intake as part of a weight control regimen. Such compounds as saccharin and cyclamate, both the sodium and calcium salts thereof, have been extensively used for these purposes. However, as is well-known, low calorie and dietetic foods sweetened with these synthetic sweeteners do not, in general, possess the desirable organoleptic qualities of foods sweetened with the natural sugars, e.g., sucrose. The natural sugars add to foods sweetened therewith certain textural properties unattainable when the snythetic sweeteners are used and these properties add greatly to the acceptability of such foods. At the same time, people using foods sweetened exclusively with argificial sweeteners are deprived of the beneficial physiological impact provided by the intake of natural sugar. Furthermore, the artificial sweeteners most commonly employed are noted for their persistent, bitter aftertaste when used in most foods. It may therefore be seen that the total elimination of natural sugar from low-calorie foods and the substitution of synthetic sweeteners therefor results in marginally acceptable organoleptic, textural and nutritive properties and is rarely called for except in certain cases of extreme physiological imbalance.

Too, one of the more important artificial sweetening agents, cyclamate, has recently been subjected to governmental restriction and is no longer in general use. Furthermore, some question exists as to the advisability of the continued widespread use of the other common, artificial sweetening agents containing nitrogen or sulfur groups in their molecular structures.

One way to overcome the difficulties and deficiencies associated with the use of artificial sweetening agents in low calorie ingestible materials, i.e., foods, beverages, candy and the like, is to provide a means whereby the sweetness of the naturally-occurring sugars is enhanced. By so doing, less of the natural sugar need be used and caloric intake is thereby decreased while the desirable organoleptic and textural properties provided by the natural sugars are preserved. One method of potentiating the sweetness of sucrose is disclosed in U.S. Pat. No. 3,282,706, wherein ammoniated glycyrrhizin is used in conjunction with sucrose. Inglett and co-workers (J. Food Science 34 101, 1969) attempted to enhance the natural sweetness of sugars using glyconic dihydrochalcones of the type described by Horowitz and Gentili in U.S. Pat. No. 3,087,821, but without success.

Surprisingly, it has now been found that certain aglyconic dihydrochalcones of the type hereinafter described can be co-dissolved with certain sugars and enhance the natural sweetness of said sugars to such an extent that much less sugar is required in a given sweetening operation. Accordingly, it is a primary and major object of the present invention to provide sweetening compositions comprising mixtures of certain aglyconic dihydrochalcones co-dissolved with certain sugars. Another object of the present invention is to provide a process for enhancing the natural sweetness properties of certain sugars. These and other objects are obtained by the present invention as will become apparent from the following disclosure.

SUMMARY OF THE INVENTION

The sweetening compositions of this invention comprise certain sugars, as hereinafter detailed, co-dissolved with an aglyconic dihydrochalcone as hereinafter defined. Mixtures of the sugars are also suitable for use herein. In its process aspects, this invention comprises a method for potentiating the sweetness of certain sugars and a method for sweetening foods, beverages, oral products and the like, by co-dissolving therein a sugar in the type disclosed herein, and one of the hereinafter detailed aglyconic dihydrochalcones, all in the proper proportions.

It has been found that the sweetness of many of the natural sugars can be enhanced by co-dissolution with one of the dihydrochalcones according to the practice of this invention. However, the sweetness of solutions of some sugars, such as mannose, arabinose and balactose, are not potentiated with quantities of dihydrochalcone sufficient to potentiate the sweetness of sugars preferred for use herein, but require a higher concentration of these materials to provide enhanced sweetening. Thus, in the practice of this invention the natural sugars glucose, fructose, sucrose, lactose, cellibiose and mixtures thereof are employed. Of these sugars, sucrose and glucose are especially preferred for use herein.

More specifically, then, the present invention encompasses sweetening compositions comprising from about 0.25% to about 95%, by weight, of a sugar selected from the group consisting of sucrose, glucose, fructose, lactose and cellibiose and a dihydrochalcone compound of the formula

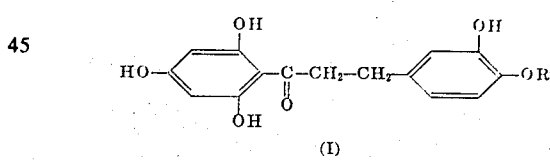

(I)

wherein R is a member selected from the group consisting of methyl, ethyl, isopropyl, propyl and butyl in a weight ratio of sugar to dihydrochalcone compound in the range from about 1:10$^{-6}$ to 1:1 co-dissolved in a solvent selected from the group consisting of ingestible polar, organic liquids, and mixtures of ingestible polar, organic liquids and water containing at least about 0.1% by weight of said ingestible polar, organic liquids.

In addition, this invention provides a process for enhancing the sweetness of sugars selected from the group consisting of sucrose, glucose, fructose, lactose and cellibiose comprising co-dissolving therewith a dihydrochalcone compound of formula (I) at a weight ratio of sugar to dihydrochalcone in the range from about 1:10$^{-6}$ to 1:1 in a solvent selected from the group consisting of ingestible polar, organic liquids, and mixtures of ingestible polar, organic liquids and water containing at least 0.1% by weight of said ingestible polar, organic liquids.

Finally, this invention provides a process for sweetening ingestible materials comprising co-dissolving therein a sugar selected from the group consisting of sucrose, glucose, fructose, lactose and cellibiose and a dihydrochalcone compound of formula (I), such that the concentration of sugar in the ingestible material is in the range from about 2% to about 70% by weight of ingestible material and the dihydrochalcone compound is co-dissolved in the ingestible material at a weight ratio of sugar to dihydrochalcone in the range from about $1:10^{-6}$ to $1:1$. This latter process preferably comprises the steps of: (a) co-dissolving from about 2% to about 70% by weight of a sugar selected from the group consisting of sucrose, glucose, fructose, lactose and cellibiose with a dihydrochalcone compound of formula (I) at a weight ratio of sugar to dihydrochalcone compound in the range from about $1:10^{-6}$ to about $1:1$ in a co-solvent which is a member selected from the group consisting of ingestible polar, organic liquids and mixtures of ingestible polar, organic liquids and water containing at least about 0.1% by weight of said ingestible polar, organic liquids, and (b) admixing the solution of step (a) with an ingestible material such that the final concentration of dissolved sugar in the ingestible material is at least about 2%, by weight.

When $R$ in the above formula (I) is methyl, the compound is hesperetin dihydrochalcone, which is preferred for enhancing and potentiating the sweetness of the sugars as herein detailed. Hesperetin dihydrochalcone can be prepared from hesperidin by hydrolysis in aqueous mineral acid, followed by catalytic hydrogenation, as later described. Alternatively, hesperetin dihydrochalcone glucoside, prepared by the method of Horowitz, U.S. Pat. No. 3,429,873, can be subjected to further hydrolysis with removal of the β-D-glucose moiety and recovery of the aglycone, hesperetin dihydrochalcone. Likewise, U.S. Pat. No. 3,375,242 describes a process for condensing naringin with isovanillin to yield neohesperidin chalcone which, on hydrogenation and complete hydrolysis of the sugar, yields hesperetin dihydrochalcone. Hesperetin dihydrochalcone prepared by any of these methods is suitable for use in the practice of the present invention.

When $R$ in formula (I) is ethyl, the compound is homohesperetin dihydrochalcone which is also preferred herein. This compound is prepared from homoneohesperidin which is prepared by the method of Krbechek, et al., J. Agr. Food Chem., 16 108 (1968) as hereinafter detailed.

When $R$ is propyl, the compound is bis-homohesperetin dihydrochalcone. When $R$ is any of the indicated groups other than methyl, the compounds are homologs of hesperetin dihydrochalcone and are prepared in much the same fashion as hesperetin dihydrochalcone as will be seen hereinafter. Of the aglyconic dihydrochalcones suitable for use in the practice of this invention, hesperetin dihydrochalcone is the most preferred.

In the practice of this invention the dihydrochalcone of formula (I) is co-dissolved with the selected sugar or mixtures of sugars to enhance the natural sweetness of said sugars and to provide sweetening compositions. These aglyconic dihydrochalcones, when dissolved in the proper solvents in concentrations of $5 \times 10^{-4}$ molar, or greater, in the manner detailed by Rizzi in the concurrently filed application entitled "Dihydrochalcone Sweetening Agents," Ser. No. 76,972, filed Sept. 30, 1970 are themselves sweet. However, when used in the practice of this invention it is not necessary to use such high concentrations of these materials. That is to say, when quantities of these compounds below their minimum perceptible sweetness concentration ($5 \times 10^{-4}$ molar) are properly co-dissolved with any of the sugars, according to this invention, the natural sweetness of the sugars is enhanced. Of course, if it is so desired, solution concentrations of these dihydrochalcones greater than about $5 \times 10^{-4}$ molar can be used in conjunction with said sugars to provide compositions of even greater sweetness. Since the concentration of sugar used in the sweetening compositions of this invention can vary over the range from 0.25% to about 95%, as hereinafter disclosed, it is more convenient to the formulator of such sweetening compositions to use a ratio of sugar to dihydrochalcone within a given, optimum range to enhance the natural sweetness of said sugar. Most generally, a weight ratio of sugar to aglyconic dihydrochalcone of formula (I) in the range from about $1:10^{-6}$ to $1:1$, more preferably from about $1:10^{-6}$ to $1:10^{-3}$, serves to enhance and intensify the natural sweetness of the sugar. At the same time, by using minimal concentrations of the dihydrochalcones within the range indicated, the flavor qualities of the sugars are not altered but only changed in intensity and rate of flavor impact.

Simple admixture of the hereindisclosed sugars and the dihydrochalcones of formula (I) does not result in the desired sweetness-enhancing effect. Therefore, it is a critical aspect of this invention that a suitable co-solvent for the dihydrochalcone and the sugar be employed. The sugars are all very soluble in water and are also soluble in a variety of polar, organic liquids. The dihydrochalcones employed herein are almost entirely insoluble in water but are soluble in various polar, organic liquids. The dihydrochalcones are also soluble in mixtures of polar, organic liquids and water. It is therefore possible to provide organic solvents and organic-aqueous solvents properly formulated to enhance the natural sweetness of the sugar and provide improved sweetening compositions.

The solvents suitable for co-solubilizing the dihydrochalcones of formula (I) and sugars used herein are any of the polar organic liquids and water containing said polar, organic liquids in the amounts hereinafter detailed. Of course, when it is desired to prepare artificial sweetening compositions suitable for prolonged or repeated ingestion by humans it is necessary to use as the co-solvent for the herein-used aglyconic dihydrochalcones and sugars a polar, organic liquid which is toxicologically acceptable. The hereinafter noted classes of polar, organic liquids can all be ingested to a greater or lesser extent by humans without ill effects. For example, many of the organic acids are found in oxidized fat mixtures and acetic acid is a well-known constituent of vinegar. As is hereinafter noted, organic acid esters are major components of most naturally-occurring flavor oils. Mercaptans are found in vegetables such as the onion and in garlic, while a variety of polar, organic liquids are known to be present in the so-called "fusel oil" component of alcoholic beverages. Many of these polar, organic liquids cause no ill effects if ingested occasionally and in low concentrations, but some should be avoided if repeated use is anticipated. Accordingly, there are certain preferred polar, organic liquids which can be employed herein singly, in combination one with another and with water, and serve to co-dissolve the dihydrochalcones of formula (I) and the sugars used herein, thereby enhancing the natural sweetness of said sugars. These preferred, polar, liquid, organic compounds are sometimes hereinafter referred to as ingestible organic solvents. Preferred, ingestible, polar, organic liquid solvents suitable for use herein, singly, in admixtures and with water for the preparation of artificial sweetening compositions containing a dihydrochalcone of formula (I) co-dissolved with a sugar selected from the group consisting of sucrose, glucose, fructose, lactose, cellibiose and mixtures thereof include the ingestible members of the hereinafter disclosed classes of polar, organic liquids, especially those detailed in the list of permitted food additives periodically prepared and issued by the United States Food & Drug Administration and published in the Federal Register, and commonly referred to as the GRAS (Generally Recognized as Safe) list.

Another group of ingestible organic solvents useful herein are the polar, organic liquids classified as safe for limited use in foods under the provisions of regulation 121.1164 of the U.S. Food and Drug Administration. A wide variety of ingestible polar, organic liquids are in this category. For example, certain liquid alcohols and glycols, low molecular weight organic acids (i.e., $C_2$-$C_{10}$) organic acid esters, aldehydes, and ketones, aromatic as well as aliphatic and mixtures thereof, serve to co-solubilize the dihydrochalcones and sugars and can be used herein, either alone or in mixtures.

Ketones such as acetophenone, 3-decen-2-one, isopulegone and the like, all serve as co-solvents herein. Aldehydes, such as benzaldehyde, decanal and the like, are similarly useful herein. A variety of alcohols can also be used to co-dissolve the aglyconic dihydrochalcone materials and the sugars used in the practice of this invention, thereby enhancing the natural sweetness of said sugars and providing artificial sweetening compositions. Ethyl alcohol, cedrol, 3-hexen-1-ol, neopentyl alcohol, 1-decanol, sorbitan monooleate polyoxyethylene and the like, are all suitable for use in this co-solvent function, singly, in admixture one with another, and in water.

The liquid organic esters of the formula R"COOR", wherein R" represents straight-chain and branched alkyl groups having one to 10 carbon atoms, represent a preferred class of solvents for use herein. The usefulness of such esters arises both because of their good solvent properties and by virtue of the fact that many esters are suitable for prolonged ingestion, themselves being major components of most natural flavor oils. Non-limiting examples of esters useful as ingestible polar, organic liquid solvents herein include: pentyl pentanoate, isobutyl formate, ethyl acetate, amyl valerate, isoamyl valerate, buty butyrate, isobutyl propionate, isoamyl decanoate, ethyl propionate, ethyl butyrate, isoamyl acetate and isobutyl valerate, all of which are suitable for use singly, in admixtures, and with water as co-solvents in the instant invention.

Various naturally-occurring and synthetically-reconstituted flavor oils which are obtainable from plants are suitably employed to co-dissolve the dihydrochalcones and sugars used in this invention. It is not possible to specify with certainty the compositions of these various oils other than that they are highly complex liquid mixtures containing polar compounds such as lactones, ketones, aldehydes, thiols, acids and acid esters. Some flavor oils contain nitriles, imides, organonitrates and the like. A long history of use by humans has shown that such flavor oils are physiologically acceptable and they are thus also preferred for use as ingestible organic solvents herein. Often, such flavor oils are employed with ethyl alcohol or propylene glycol to provide various extracts, tinctures and concentrates containing said oils and it is a contemplated mode of the practice of this invention that such solutions be used as co-solvents herein. These naturally-occurring, ingestible organic solvent oils can also be used concurrently with water and any of the above-noted preferred solvents. Non-limiting examples of flavor oils suitable for employment as co-solubilizing agents for the sugars used herein and the aglyconic dihydrochalcones of formula (I) include: oil of sweet birch, oil of spearmint, oil of wintergreen, oil of sassafras, cedarwood oil, anise oil, pine oil, dill oil, celery seed oil, various citrus oils including lemon, orange, lime, tangerine and grapefruit oils, clove oil, peppermint oil, cassia, carrot seed oil, cola concentrate, ginger oil, angelica oil and the like, and mixtures thereof, all of which can be used in the practice of this invention as co-solvents. These oils are obtained from the appropriate plant sources by extraction in the manner well-known to those skilled in the art.

Any of the above-described ingestible polar, organic liquids can be used in conjunction with water to provide aqueous-organic solvent systems which serve to co-dissolve the aglyconic dihydrochalcones and the sugars and provide sweetening compositions. For example, hesperetin dihydrochalcone can be dissolved in ethyl alcohol and then diluted with a solution of sucrose in water to yield a 0.001% solution of said dihydrochalcone containing five percent ethyl alcohol and 30 percent sucrose, which composition is suitable for sweetening foods and beverages. In like fashion, a mixture of ethyl acetate and water can be used to dissolve hesperetin dihydrochalcone and glucose to yield a composition containing about a $5 \times 10^{-5}\%$ concentration of dihydrochalcone and 20 percent glucose, said composition being likewise suitable for sweetening foods and beverages. Alternatively, hesperetin dihydrochalcone can be co-dissolved with a solution of twenty percent fructose in ethyl alcohol at a $2 \times 10^{-5}\%$ concentration and the solution employed as a sweetening composition. Thus, it is seen that co-dissolution of the dihydrochalcones of formula (I) and the various sugars used herein in ingestible polar, organic liquids, in mixtures thereof, and in mixtures thereof and water, results in solutions suitable for use as artificial sweetening agents.

Especially preferred ingestible solvents used herein are orange oil, tangerine oil, lemon oil, lime oil, grapefruit oil, spearmint oil, peppermint oil, clove oil, ethyl alcohol, 1,2-dihydroxypropane, acetic acid, isoamyl acetate, isoamyl valerate, butyl butyrate, isobutyl propionate and sorbitan monooleate polyoxyethylene, singly, in combination and in combination with water.

Co-dissolution of the aglyconic dihydrochalcone of formula (I) and the sugar so as to enhance thereby the natural sweetness of the sugar can be accomplished by simple admixture with any of the solvent compositions herein noted. Gentle warming can be employed to speed the rate of dissolution but this is entirely optional as these com-pounds are found to be quite soluble in the above-noted solvents. When heating is employed, temperatures of from 40° to 90° C. are suitable. Preparation of aqueous-organic solutions of the dihydrochalcone and sugar, which are preferred herein, can be accomplished by dissolving the dihydrochalcone in the ingestible polar, organic liquid and admixing the resulting solution with water containing the sugar, and also by simply adding the dihydrochalcone to a mixture of water, sugar and ingestible polar, organic liquid. Both of these methods are suitably employed in the practice of this invention but it is usually found to be quicker to dissolve the dihydrochalcone in the ingestible polar, organic liquid and then to admix the resulting solution with the sugar dissolved in water. The amount of ingestible organic solvent required to dissolve the dihydrochalcones employed herein is not critical since any of the above-named solvents will dissolve sufficient material to provide compositions well within the preferred range of sugars and dihydrochalcones taught herein to be sweetening compositions. Generally, weight ratios of organic solvent:dihydrochalcone of about 1:1, and greater, are employed, with ratios greater than about 10:1 being preferred. Similar organic solvent ratios are suitable for dissolving the sugars, and it may therefore be seen that said ratios are satisfactory in co-solubilizing the sugars and the dihydrochalcones. When aqueous-organic solvent systems are employed to co-dissolve the sugar and the dihydrochalcone, the total concentration of polar, organic liquid needed to insure solubility of the dihydrochalcone in the water depends to some extent on the amount of dihydrochalcone to be dissolved (solubility of the sugars in water is no problem since the water solubility of these compounds is exceptionally high). In general, a ratio of one part dihydrochalcone to one part ingestible polar, organic liquid will insure solubility of said dihydrochalcone in water. However, the total concentration of the ingestible, organic solvent in the resulting solution should be not less than 0.10%, more preferably not less than 0.25%, by weight of total solvent.

As hereinbefore noted, many of the ingestible polar organic liquids which can be used to co-dissolve the sugars and the dihydrochalcones, especially the esters, have flavor properties of their own and are recognized as being major constituents in many natural flavor oils. Thus, when such solvents are used herein, even at low concentrations, they will impart to the food being sweetened some of their own flavor; this is sometimes desirable. However, when it is desired to prepare artificial sweetening compositions comprising a sugar or sugar mixture, as herein detailed in combination with a dihydrochalcone of formula (I) having essentially no flavor sensation other than that of the enhanced natural sweetness of the sugar, it is necessary to employ as the ingestible organic co-solvent a material having little, or no, flavor properties of its own. Of course, the compounds must serve to co-solubilize the dihydrochalcone and the sugar. Two ingestible organic solvents which fulfill these requirements are ethyl alcohol and 1,2-dihydroxypropane and these solvents are preferred for use herein when it is desired to prepare artificial sweetening compositions having no additional flavor properties. Of course, such sweetening compositions prepared with ethyl alcohol or 1,2-dihydroxypropane can be flavored by the addition of flavor oils, if so desired.

The useful concentration of 1,2-dihydroxypropane in the sweetening compositions comprising a sugar and a dihydrochalcone of formula (I) is limited by the astringency of this compound. For this reason, sweetening compositions containing this solvent should contain no more than about three percent of the 1,2-dihydroxypropane, the remainder of the solvent being water or ethyl alcohol. Alternatively, more concentrated solutions of 1,2-dihydroxypropane, or the compound itself, can be used in the preparation of concentrated sweetening compositions which, in use, are diluted so that the amount of 1,2-dihydroxypropane in the sweetened food is below the astringency level.

When ethyl alcohol is selected as the organic solvent for use in this invention it can be used singly and in various proportions with water. Solutions of the sugars and dihydrochalcones in the concentration ranges herein disclosed in pure ethanol, and in ethanol-water mixtures containing from about 0.1% to 99% ethanol are all suitable for use as sweetening compositions.

When it is desired to sweeten ingestible materials such as food, beverages, candies, confections and the like, by the practice of this invention and said ingestibles are flavored by the addition of natural or synthetic flavoring oils, the dihydrochalcones can be simply dissolved in said flavor oils prior to use. The sugars are dissolved in the water used to prepare said ingestible materials and, on addition of the flavor oil-solubilized dihydrochalcone thereto, the sweetness of the sugar is enhanced and the resulting food or beverage is flavored and sweetened simultaneously. Thus, no organic co-solvent other than the flavor oil, is required. Of course, any of the hereinbefore disclosed organic solvents can be used as a co-solvent if so desired.

The following procedures illustrate the preparation of dihydrochalcones of formula (I) used herein. The sugars used herein are common compositions of the trade and are widely available from various commercial sources.

PREPARATION OF HESPERETIN DIHYDROCHALCONE

A solution of hesperidin (25 g.) in 125 ml. of 10% aqueous potassium hydroxide was allowed to remain at 25° C. for 30 minutes. Then 2.0 g. 10% Pd/charcoal catalyst was added and the mixture was hydrogenated on a pressure apparatus for 18 hours under 30 p.s.i.g. $H_2$ pressure. The hydrogenation mixture was filtered to remove the catalyst and the volume of filtrate was adjusted to 300 ml. by adding water. Then 2.5 ml. of concentrated HCl were added and the mixture was refluxed for 5 hours. The reaction mixture was cooled to 25° C and extracted with three-250 ml. portions of ethyl acetate. Evaporation of the ethyl acetate under reduced pressure gave a reddish/yellow oil which was subsequently suspended in water (about 100 ml.) and extracted twice with 250 ml. portions of diethyl ether. Evaporation of the ether under reduced pressure gave crude, crystalline hesperetin dihydrochalcone which was then recrystallized from 2:1 ethanol/water to yield (after vacuum drying at 25° C.) 11.32 g. (90% yield based on hesperidin) of pure hesperetin dihydrochalcone. A sample of hesperetin dihydrochalcone which was recrystallized repeatedly (four times) from 2:1 ethanol/water and dried two hours at 56° C under 0.1 mm. Hg pressure had a melting point of 144°–146° C. (dec.)

Anal.: Calculated for $C_{16}H_{16}O_6 \cdot 1/2\ H_2O$
C, 61.4; H, 5.4 Found: C, 61.8, 61.9
H, 5.9, 5.7

PREPARATION OF HOMOHESPERETIN DIHYDROCHALCONE

A mixture of 1.0 g. of homoneohesperidin, m.p. 219°–223° C., prepared by the method of Krbechek, et al., J. Agr. Food Chem., 16, 180 (1968), 25 ml. water, 25 ml. ethanol and 0.5 ml. of concentrated $H_2SO_4$ was refluxed for 72 hours. The cooled (25° C.) reaction mixture was diluted with water and extracted three times with ethyl acetate (about 100 ml. each time). The ethyl acetate solution was dried over anhydrous $MgSO_4$, filtered to remove drying agent and concentrated under reduced pressure to yield a brownish oil. The oil was crystallized from aqueous isopropanol to yield 0.207 g. (42% yield) of homohesperetin having an m.p. of 85°–88° C. The product was shown to be homogeneous by thin layer chromatography. The $^1H$ nmr spectrum obtained in DMSO -$d^6$ supported the structure claimed in that the following signals were observed: $\delta$ 0.79, triplet, $J = $ Hz. and $\delta$ 0.24 quartet, $J = $ 6 Hz. (ethoxy group), the ratio of methyl/methylene/aromatic protons was in the expected ratio of 3:2:5.

The homohesperetin, 0.173 g. (m.p. 85°–88° C.), was then dissolved in 20 ml. of 8.5% aqueous KOH, 0.43 g. of 10% Pd/charcoal catalyst was added and the mixture was hydrogenated with $H_2$ under atmospheric pressure for 4.0 hours during which time one molar equivalent of hydrogen was absorbed. The reaction mixture was filtered and the filtrate was acidified by adding 4N HCl (pH ca. 2). The white precipitate which separated was collected by filtration and dried in air. The dried product comprised 0.117 g. (67%) yield) of homohesperetin dihydrochalcone with a melting point of 96.5°–97.5° C. The compound was shown to be homogeneous by thin layer chromatography and its structure was verified by $^1H$ nmr analysis in DMSO -$d^6$ solution: $\delta$ 0.69 triplet, $\delta$ 2.22 quartet (ethoxy group), $\delta$ 1.17, four broad peaks due to adjacent methylenes flanked by a carbonyl group and an aromatic ring, and by infrared analysis of a sample in KBr: broad absorption at 6.25 – 6.45$\mu$ (strongly hydrogen bonded carbonyl group, typical of phloroacetophenone type molecules).

PREPARATION OF BIS-HOMOHESPERETIN DIHYDROCHALCONE

One mole of 3-hydroxy-4-n-propoxygenzaldehyde is condensed with one mole of 4'-$\beta$-neohesperidosylphloroacetophenone in the presence of 0.25 moles of KOH in ethanol solvent. The resulting chalcone is cylized to a flavanone glycoside by warming an aqueous solution thereof at pH 5. Prolonged boiling of the flavanone glycoside in stronger mineral acid (one hour, refluxing 3M HCl) cleaves the sugar and yields the aglyconic material, bis-homohesperetin. The bis-homohesperetin is contacted with 10% aqueous KOH at room temperature for 30 minutes then hydrogenated in the presence of a Pd/charcoal catalyst and refluxed with concentrated HCl for 3 hours. Following ether extraction, the crude product, recrystallized from aqueous ethanol, proves to be bis-homohesperetin dihydrochalcone.

The 3-hydroxy-4-n-propoxybenzaldehyde is replaced by 3-hydroxy-4-isopropoxygenzaldehyde and 3-hydroxy-4-n-butoxybenzaldehyde, respectively, and the corresponding isopropoxy and n-butoxy compounds, ixo-homohesperetin dihydrochalcone and butoxy-homohesperetin dihydrochalcone are obtained.

The sugars hereinabove disclosed for use in this invention are soluble in water and any of the polar, organic liquid solvents and solvent mixtures hereinabove disclosed. The solid sugars can be dissolved in any of the herein-disclosed solvents and solvent mixtures, especially those preferred mixtures employing water, in concentrations from about 0.25% to about 95%, by weight. At the lower concentrations, the sugars are almost imperceptibly sweet to most people; hence, a more preferred range of sugar concentrations is from about 2% to about 70%, by weight. The solutions containing the sugar and the dihydrochalcone which provide sweetening compositions have co-dissolved therein from about 0.25% to about 95%, more preferably from about 2 to about 70%, of a sugar, as hereinabove disclosed and from about $10^{-6}$ parts to about 1 part dihydrochalcone of formula (I) for each part sugar. In each case, the sweetening composition will contain at least 0.1% of the organic solvent used to solubilize the dihydrochalcone.

ORGANOLEPTIC EVALUATIONS

In the following test, four subjects were selected at random and tasted the test solutions, without knowledge of their composition. The results are as shown in Table 1.

TABLE 1.—Sweetness Enhancement by Dihydrochalcones

| Solution composition | Degree of sweetness |
|---|---|
| A — 0.25% glucose in water | None. |
| B — 5×10$^{-5}$ molar hesperetin dihydrochalcone (0.25% ethyl alcohol + 95% Water Solvent). | Do. |
| C — 0.25% Glucose + 5×10$^{-5}$ molar hesperetin dihydrochalcone (co-dissolved in 0.25% ethyl alcohol + 99.75% water solvent). | Sweet. |

The enhanced sweetness of the combination of the dihydrochalcone and the sugar was apparent to all subjects.

Because of the wide variations in the response to physiological stimuli, and the subjective nature of that response, it is inappropriate to attempt to quantify the results from the tests designed to demonstrate the enhanced sweetness properties of sugars when co-dissolved with the dihydrochalcones in the manner of this invention. In general, it can be said that dissolution of the dihydrochalcones of formula (I) with the sugars herein noted, especially the preferred sugars, glucose, fructose and sucrose, in the ratios hereinbefore noted, causes a 1.5- to 2-fold enhancement of the natural sweetness of said sugars.

It has been seen that sweetening compositions are obtained when the herein disclosed sugars and a dihydrochalcone of formula (I) are co-dissolved in a ratio of about 1:10$^{-6}$ sugar:dihydrochalcone, by weight, in the manner herein disclosed in ingestible polar, organic liquids and mixtures thereof with water containing a concentration at least about 0.10%, more preferably at least about 0.25%, by weight of said ingestible polar, organic liquids such that the final concentration of dissolved sugar is in the range as noted above. The following examples are sweetening compositions which can be prepared by co-dissolving dihydrochalcones of formula (I) with various sugars in ingestible organic solvents and mixtures of said solvents with water and their manner of preparation. The examples are only for the purpose of illustration and are not intended to limit the scope of the invention.

EXAMPLE I 0.2 gram of hesperetin dihydrochalcone is dissolved in 100 g. of ethyl alcohol and 1000 g. of water is admixed therewith; 80 g. of sucrose is then dissolved in the solution. The resulting solution is suitable for use as a sweetening composition without further treatment.

EXAMPLE II

Three-fourths gram of hesperetin dihydrochalcone is dissolved in 20 g. of 1,2-dihydroxypropane with gentle warming and 1000 g. of water containing 300 g. dissolved glucose is added thereto. The resulting solution is suitable for use as a sweetening composition without further treatment.

The 1,2-dihydroxypropane is replaced by an equivalent amount of sorbitan monooleate polyoxyethylene and a sweetening composition is secured.

EXAMPLE III

One-half gram of homohesperetin dihydrochalcone is dissolved in a mixture of 1000 g. of water and 50 g. of ethyl alcohol with gentle warming; 150 g. of fructose is dissolved in the solution. The resulting solution is suitable for use as a sweetening composition without further treatment.

EXAMPLE IV

A vanilla-flavored sweetening composition suitable for simultaneously sweetening and flavoring foodstuffs is prepared as follows: one-tenth part hesperetin dihydrochalcone is dissolved in 10 parts vanillin and 500 parts water, and 50 parts cellibiose added thereto.

EXAMPLE V

Five parts of hesperetin dihydrochalcone is dissolved in 10 parts bitter almond oil and the resulting solution is added to a solution of 5 parts sucrose in 100 parts water and provides an almond-flavored sweetening composition.

EXAMPLE VI

One one-thousandth part of bis-homohesperetin dihydrochalcone is dissolved in 10 parts of isoamylacetate and 1,000 parts of a 95% aqueous fructose solution added thereto. The resulting solution provides a banana-flavored sweetening composition.

EXAMPLE VII $5 \times 10^{-4}$ mole of hesperetin dihydrochalcone is dissolved in 20 ml. of isoamyl valerate and the resulting solution diluted with 1,000 ml. of a solution comprising 400 g. of lactose dissolved in one liter of water to provide an apple-flavored sweetening composition.

EXAMPLE VIII

One part of hesperetin dihydrochalcone is dissolved in 20 parts of butyl butyrate and added to 50,000 parts of a 50% aqueous glucose solution to provide a pineapple-flavored sweetening composition.

EXAMPLE IX

One-thirty second part of hesperetin dihydrochalcone is dissolved in 1 part of isobutyl propionate and the solution admixed with one liter of a 50% aqueous sucrose solution to provide a rum-flavored sweetening composition.

EXAMPLE X $5 \times 10^{-7}$ mole of iso-homohesperetin dihydrochalcone is dissolved in 15 ml. of a synthetic pineapple oil (corresponding to winter fruit) consisting of 2.91 parts ethyl acetate, 0.61 parts acetaldehyde, 0.45 parts methyl n-valerate, 0.60 parts methyl isovalerate, 1.40 parts methyl isocaproate and 0.75 parts methyl caprylate and thence diluted to 1 liter with a solution of 50 parts mannose in 100 parts water to provide a pineapple-flavored sweetening composition.

The iso-homohesperetin dihydrochalcone is replaced with an equivalent amount of butoxy-homohesperetin dihydrochalcone and a sweetening composition is secured.

EXAMPLE XI

A sweetening composition having a spearmint flavor is prepared as follows: $5 \times 10^{-4}$ mole of homohesperetin dihydrochalcone is dissolved in 1000 ml. of water in which is dissolved 0.15% spearmint oil and a mixture of 20 g. sucrose and 20 g. fructose by heating for 10 minutes at 60° C.

The spearmint oil is replaced by oil of sweet birch, oil of wintergreen, oil of sassafras, cedar wood oil, anise oil, pine oil, dill oil, celery seed oil, lemon oil, lime oil, orange oil, grapefruit oil, tangerine oil, peppermint oil, clove oil, cassia, carrot seed oil, cola concentrate, ginger oil, angelica oil and mixtures thereof, respectively, and sweetening compositions of the corresponding flavors are secured.

EXAMPLE XII

A sweetening composition is prepared as follows: 0.2 mole of hesperetin dihydrochalcone is dissolved in 2,000 ml. of ethyl alcohol and 50 g. of sucrose is co-dissolved therewith.

As illustrated by the foregoing, mixtures of the sugars and dihydrochalcones herein disclosed, co-dissolved in appropriate organic and aqueous-organic solvent, provide both flavored and unflavored sweetening compositions. These sweetening compositions can, themselves, be ingested but are more often used to sweeten other ingestible materials such as foods, beverages, confections and the like. It will be recognized that co-dissolution of the type (I) dihydrochalcones with the sugars herein disclosed enhances the natural sweetness of these sugars. However, as hereinbefore noted, many such sugars are only marginally sweet when ingested in concentrations below about 1% by weight in ingestible materials. It is therefore preferable to sweeten ingestible materials by dissolving therein about 2%, preferably from about 2% to about 70%, by weight, of a sugar in which is co-dissolved a dihydrochalcone of formula (I) in the ratios hereinbefore disclosed. Again, a co-solvent for the sugar and dihydrochalcone is needed. Very few foods contain quantities of uncombined polar, organic liquids sufficient to co-solubilize these materials. Hence, it is preferable to sweeten ingestible materials by adding thereto, and solubilizing therein, solutions of sugars and dihydrochalcones pre-dissolved in the manner and in the solvents as hereinbefore detailed. Accordingly, a preferred method aspect of the present invention comprises adding to an ingestible material, i.e., a food, beverage, confection, candy and the like, a compound of formula (I) co-dissolved with from about 2% to 70% of a sugar in a solvent selected from the group consisting of ingestible polar, organic liquid and in mixtures of water containing at least 0.10%, by weight, of said ingestible polar, organic liquid such that the total concentration of sugar dissolved in the ingestible material is 2% to about 70% and the total concentration of dihydrochalcone of formula (I) dissolved therein is in the ratio range of from about $1:10^{-6}$ to $1:1$ sugar:dihydrochalcone, on a weight basis. The following examples of foods, beverages and the like, sweetened in this fashion are for the purpose of illustration and are not intended to be limiting of this method aspect of the present invention.

EXAMPLE XIII

A sweetened beverage is prepared as follows: 0.2 parts lemon oil, 0.2 parts hesperetin dihydrochalcone, 0.1 part phosphoric acid, 20 parts sucrose and 56.8 parts water are co-dissolved.

The lemon oil is replaced by an equivalent amount of lime oil, orange oil, grapefruit oil, tangerine oil, oil of sweet birch, oil of spearmint, oil of wintergreen, oil of sassafras, cedarwood oil, anise oil, pine oil, dill oil, celery seed oil, peppermint oil, clove oil, cassia, carrot seed oil, cola concentrate, ginger oil and angelica oil, and mixtures thereof, respectively, and beverages of the corresponding flavors are obtained.

EXAMPLE XIV

A sweetened orange juice concentrate is prepared as follows: 80% of the water from expressed orange juices is removed by flash evaporation; next a sweetening composition and 100 parts water is added to the orange juice concentrate in the ratio of 10 parts orange juice concentrate to 1 part sweetening composition.

EXAMPLE XV

A sweetened pastry topping is prepared as follows: 0.001 part of homohesperetin dihydrochalcone is dissolved in 10 parts bitter almond extract and 10 parts sorbitan monooleate polyoxyethylene and the resulting solution is dissolved in 100 parts of a 95% aqueous glucose solution. The total solution is then admixed with a glaze prepared from equal parts water and corn starch.

EXAMPLE XVI

Brewed coffee and tea are sweetened as follows: a sufficient volume of the sweetening composition described in Example I is added to coffee and tea, respectively, such that the final concentration of dissolved sucrose is 2% by weight of the brewed beverage, or greater, according to taste.

EXAMPLE XVII

A sweetened gelatin dessert is prepared as follows: a sufficient volume of the sweetening composition described in Example II is added to a liquified gelatin solution such that the final concentration of dissolved glucose in the solution is 2% by weight, or greater, according to taste; the solution is gelled by chilling.

EXAMPLE XVIII

A sweet-sour salad dressing is prepared as follows: in 100 parts vinegar are dissolved $3 \times 10^{-5}$ part hesperetin dihydrochalcone, 30 parts cellibiose, 0.1 part 3-hexen-2-one and 150 parts liquid salad oil are co-mixed therewith.

I claim:

1. A liquid sweetening composition comprising: (1) from about 0.25% to about 95% of a sugar selected from the group consisting of sucrose, glucose, fructose, lactose and cellibiose; (2) a dihydrochalcone compound of the formula

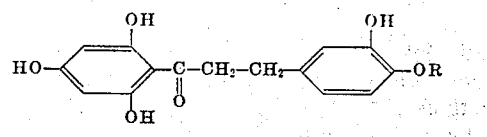

wherein $R$ is a member selected from the group consisting of methyl, ethyl, isopropyl, propyl and butyl in a weight ratio of sugar to dihydrochalcone compound in the range from about $1:10^{-6}$ to $1:1$; and (3) the balance of said composition being a solvent selected from the group consisting of ingestible polar, organic liquids and mixtures of ingestible polar, organic liquids and water, said mixtures containing at least about 0.1% of said ingestible polar, organic liquids.

2. A composition according to claim 1 where the weight ratio of sugar to dihydrochalcone compound is in the range of $1:10^{-6}$ to $1:10^{-3}$.

3. A composition according to claim 1 wherein the dihydrochalcone compound is hesperetin dihydrochalcone.

4. A composition according to claim 1 wherein the ingestible polar, organic liquid co-solvent is selected from the group consisting of liquid alcohols, glycols, low molecular weight organic acids, organic acid esters, aldehydes, ketones, and mixtures thereof.

5. A composition according to claim 1 wherein the ingestible polar, organic liquid is selected from the group consisting of ethyl alcohol, 1,2-dihydroxypropane, acetic acid, isoamyl acetate, isoamyl valerate, butyl butyrate, isobutyl propionate, sorbitan monooleate polyoxyethylene and mixtures thereof.

6. A composition according to claim 1 wherein the ingestible polar, organic liquid co-solvent is a member selected from the group consisting of oil of sweet birch, oil of spearmint, oil of wintergreen, oil of sassafras, cedarwood oil, anise oil, pine oil, dill oil, celery seed oil, lemon oil, orange oil, lime oil, grapefruit oil, clove oil, peppermint oil tangerine oil, cassia, carrot seed oil, cola concentrate, ginger oil and angelica oil.

7. A composition according to claim 1 wherein the co-solvent is water containing at least about 0.1% of an ingestible polar, organic liquid.

8. A composition according to claim 1 wherein the solvent is water containing more than about 0.1% of an ingestible polar, organic liquid selected from the group consisting of orange oil, lemon oil, lime oil, grapefruit oil, spearmint oil, peppermint oil, clove oil, ethyl alcohol, 1,2-dihydroxypropane, acetic acid, isoamyl acetate, isoamyl valerate, butyl butyrate, isobutyl propionate and mixtures thereof.

9. A process for enhancing the sweetness of sugars selected from the group consisting of sucrose, glucose, fructose, lactose and cellibiose comprising co-dissolving therewith dihydrochalcone compound of the formula

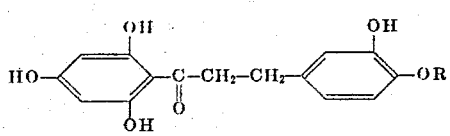

wherein $R$ is a member selected from the group consisting of methyl, ethyl, isopropyl, propyl and butyl in a weight ratio of sugar to dihydrochalcone in the range from about $1:10^{-6}$ to $1:1$ in a solvent selected from the group consisting of ingestible polar, organic liquids and mixtures of ingestible polar, organic liquids and water, said mixtures containing at least about 0.1% by weight of said ingestible polar, organic liquids.

10. A process according to claim 9 where the weight ratio of sugar to dihydrochalcone compound is in the range of $1:10^{-6}$ to $1:10^{-3}$.

11. A process according to claim 9 wherein the dihydrochalcone compound is hesperetin dihydrochalcone.

12. A process according to claim 9 wherein the ingestible polar, organic liquid is selected from the group consisting of liquid alcohols, glycols, low molecular weight organic acids, organic acid esters, aldehydes, ketones and mixtures thereof.

13. A process according to claim 9 wherein the ingestible polar, organic liquid is selected from the group consisting of ethyl alcohol, 1,2-dihydroxypropane, acetic acid, isoamyl acetate, isoamyl valerate, butyl butyrate, isobutyl propionate, sorbitan monooleate polyoxyethylene and mixtures thereof.

14. A process according to claim 9 wherein the ingestible polar, organic liquid is selected from the group consisting of oil of sweet birch, oil of spearmint, oil of wintergreen, oil of sassafras, cedarwood oil, anise oil, pine oil, dill oil, celery seed oil, lemon oil, orange oil, lime oil, grapefruit oil, clove oil, peppermint oil, tangerine oil, cassia, carrot seed oil, cola concentrate, ginger oil and angelica oil.

15. A process according to claim 9 wherein the solvent consists essentially of water containing at least 0.1% of an ingestible polar, organic liquid.

16. A process according to claim 9 wherein the solvent is water containing at least 0.1% of an ingestible polar, organic liquid selected from the group consisting of orange oil, lemon oil, lime oil, grapefruit oil, spearmint oil, peppermint oil, clove oil, ethyl alcohol, 1,2-dihydroxypropane, acetic acid, isoamyl acetate, isoamyl valerate, butyl butyrate, isobutyl propionate, sorbitan monooleate polyoxyethylene and mixtures thereof.

17. A process for sweetening foods, beverages and confections comprising adding thereto the composition of claim 1 such that the final concentration of dissolved sugar therein is at least about 2%, by weight.

18. A process according to claim 17 wherein the dihydrochalcone compound is hesperetin dihydrochalcone.

19. A process according to claim 17 wherein the solvent is selected from the group consisting of the natural flavor oils, ethyl alcohol, 1,2-dihydroxypropane, acetic acid, sorbitan monooleate polyoxyethylene and liquid organic acid esters.

* * * * *